(12) United States Patent
Chung (10) Patent No.: US 10,578,280 B2
(45) Date of Patent: Mar. 3, 2020

(54) ILLUMINATOR

(71) Applicant: Tung-Kuei Chung, Taichung (TW)

(72) Inventor: Tung-Kuei Chung, Taichung (TW)

( * ) Notice: Subject to any disclaimer, the term of this patent is extended or adjusted under 35 U.S.C. 154(b) by 0 days.

(21) Appl. No.: 16/352,826

(22) Filed: Mar. 14, 2019

(65) Prior Publication Data

US 2019/0360663 A1    Nov. 28, 2019

(30) Foreign Application Priority Data

May 28, 2018 (TW) .............................. 107206969 U (51) Int. Cl.
| | | |
|---|---|---|
| *F21V 13/04* | (2006.01) | |
| *F21V 7/04* | (2006.01) | |
| *F21V 5/04* | (2006.01) | |
| *G02B 5/32* | (2006.01) | |
| *F21V 17/08* | (2006.01) | |
| *F21W 121/00* | (2006.01) | |
| *F21Y 115/10* | (2016.01) | |

(52) U.S. Cl.
CPC ................ *F21V 13/04* (2013.01); *F21V 5/04* (2013.01); *F21V 7/043* (2013.01); *F21V 17/08* (2013.01); *G02B 5/32* (2013.01); *F21W 2121/00* (2013.01); *F21Y 2115/10* (2016.08)

(58) Field of Classification Search
CPC ...... F21S 6/00–008; F21S 10/00; F21S 10/02; F21V 7/00; F21V 7/04; F21V 7/043
See application file for complete search history.

(56) References Cited

U.S. PATENT DOCUMENTS

| | | | | |
|---|---|---|---|---|
| 5,822,088 A | * | 10/1998 | Danno | ..................... G03H 1/22 |
| | | | | 359/1 |
| 2003/0184831 A1 | * | 10/2003 | Lieberman | ............... G03H 1/22 |
| | | | | 359/32 |
| 2009/0135380 A1 | * | 5/2009 | Chien | .................. H04N 5/2354 |
| | | | | 353/122 |
| 2015/0338042 A1 | * | 11/2015 | Patton | ................. F21V 33/0052 |
| | | | | 348/742 |

FOREIGN PATENT DOCUMENTS

| | | | | |
|---|---|---|---|---|
| JP | 2005205855 A | * | 8/2005 | |
| JP | 2006114298 A | * | 4/2006 | |
| JP | 2007026827 A | * | 2/2007 | .............. F21S 6/002 |

* cited by examiner

*Primary Examiner* — Mariceli Santiago (74) *Attorney, Agent, or Firm* — Bruce Stone LLP; Joseph Bruce (57) ABSTRACT

An illuminator includes a hologram label and light-emitting diodes. The hologram label includes a reflective face. The light-emitting diodes are located near the hologram label. The light-emitting diodes are used to emit incident light onto the reflective face of the hologram label that reflects the incident light and hence provides reflected light. The incident light is colorless, and the reflected light is in at least one color.

13 Claims, 12 Drawing Sheets

ILLUMINATOR

SUMMARY OF INVENTION

1. Field of Invention

The present invention relates to a lamp and, more particularly, to an illuminator that uses chromatic dispersion or glister to provide a 3-dimensional ('3D') visional effects such as symphony and glister.

2. Related Prior Art

There are many types of illuminators such as fluorescent lamps, table lamps, recessed lamps, ceiling lamps, chandeliers and wall lamps. Such a typical lamp includes a holder for holding a light source and a pair of wires. The light source emits light for illumination or decoration when it receives electricity via the pair of wires.

The light can be colorless (or 'daylight') for illumination in an environment for readying and writing for example. The light can be red, orange, yellow, green, blue, cyan or purple for decoration in an occasion such as a party, a concert and any other types of gathering.

A prism can turn colorless light into beams in various colors because of refraction, but this does not happen automatically. Light in various colors can be mixed with one another and turned into colorless light, but this does not happen automatically. The color of light cannot be changed automatically.

A lamp includes a doll supported on a base. The doll is provided with a collapsible device at a back. A light source is connected to the collapsible device. The light source can be actuated to emit light into the doll. However, the light does not considerably change a visional effect provided by the doll. In specific, the light does not cause an illusion that the doll moves.

The present invention is therefore intended to obviate or at least alleviate the problems encountered in prior art.

SUMMARY OF INVENTION

It is the primary objective of the present invention to provide an illuminator that uses chromatic dispersion or glister to provide 3D visional effects such as symphony and glister.

To achieve the foregoing objective, the illuminator includes a hologram label and light-emitting diodes. The hologram label includes a reflective face. The light-emitting diodes are located near the hologram label. The light-emitting diodes are used to emit incident light onto the reflective face of the hologram label that reflects the incident light and hence provides reflected light. The incident light is colorless, and the reflected light is in at least one color.

Other objectives, advantages and features of the present invention will be apparent from the following description referring to the attached drawings.

BRIEF DESCRIPTION OF DRAWINGS

The present invention will be described via detailed illustration of several embodiment referring to the drawings wherein.

DETAILED DESCRIPTION OF PREFERRED EMBODIMENT

Figure 1:
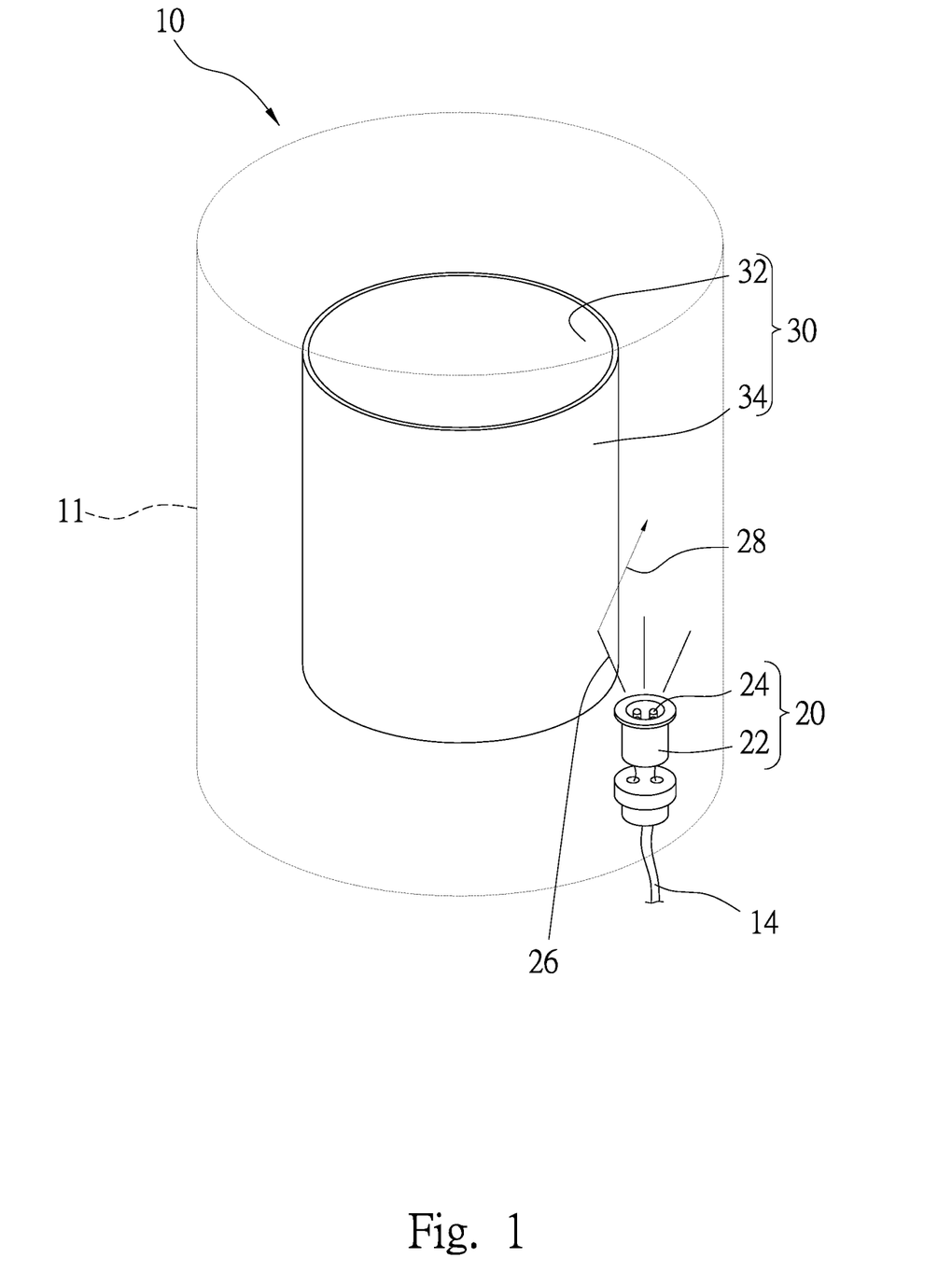
FIG. 1 is a perspective view of an illuminator according to a first embodiment of the present invention.

Referring to FIG. 1, an illuminator 10 includes a lens 11, a light source 20 and hologram label 30 according to a first embodiment of the present invention. The lens 11 wraps the light source 20 and the hologram label 30.

The lens 11 is in a circular or non-circular such as rectangular, hexagonal and any other polygonal configuration. The lens 11 protects the hologram label 30.

The hologram label 30 is in a tubular configuration and hence includes an internal face 32 and an external face 34. The external face 34 is used as a reflective face. The hologram label 30 is located in the lens 11.

The light source 20 includes at least one LED-based lamp. There are preferably several LED-based lamps arranged in a circular or elongated formation. Each of the LED-based lamps includes a light-emitting diode 24 held by a holder 22. The holder 22 is electrically connected to a pair of wires 14.

Figure 2:
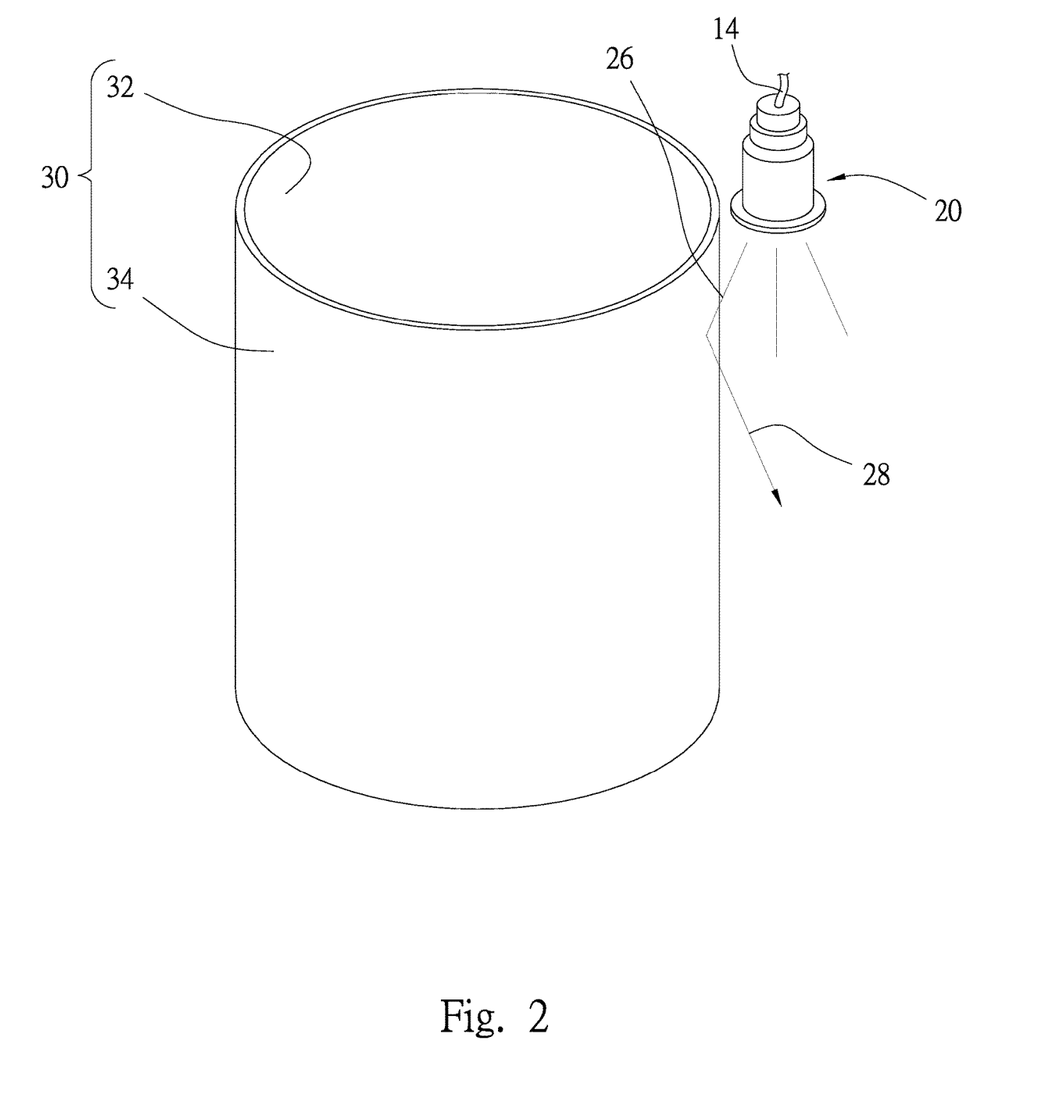
FIG. 2 is a perspective view of the illuminator with a light source in another position than shown in FIG. 1.
Figure 3:
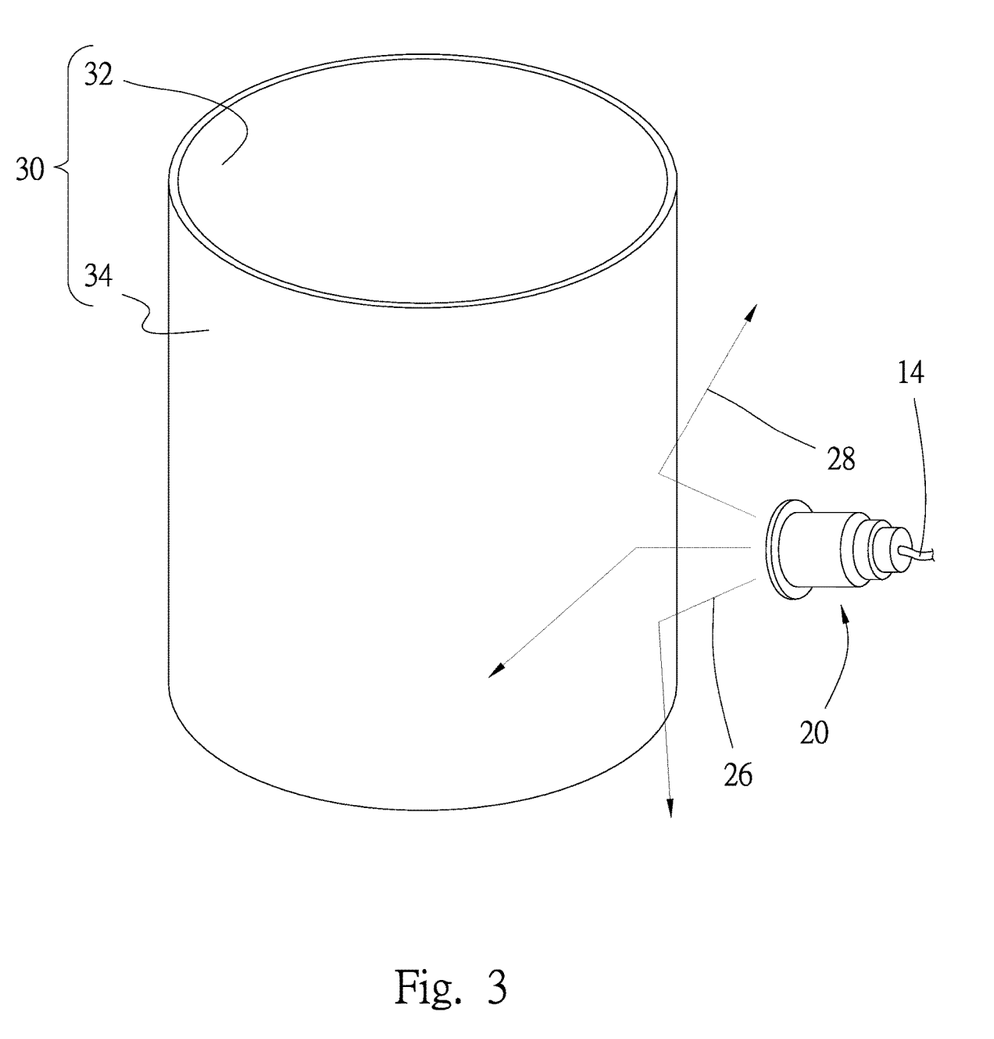
FIG. 3 is a perspective view of the illuminator with the light source in another position than shown in FIG. 2.

The light source 20 is located between the lens 11 and the hologram label 30. The light-emitting diodes 24 are located below the hologram label 30 referring to FIG. 1, located above the hologram label 30 referring to FIG. 2, or pointed at the external face 34 of the hologram label 30 referring to FIG. 3. The light-emitting diodes 24 can be in any other positions without affecting cast of light on the external face 34 from the light-emitting diodes 24.

Referring to FIG. 1, when the illuminator 10 is energized, the light-emitting diodes 24 of the light source 20 cast at least one beam of incident light 26. The incident light 26 is cast onto the external face 34 of the hologram label 30 and get reflected and turned into to at least one beam of reflected light 28. In practice, there are various beams of reflected light 28. The reflected light 28 goes to the exterior of the illuminator 10 through the lens 11.

The incident light 26 is colorless and sometimes called white light or daylight. The reflected light 28 can be in red, orange, yellow, green, blue, cyan or purple according to an angle at which the reflected light 28 travels. Thus, when the illuminator 10 is observed at different angles, the reflected light 28 exhibits different colors to provide 3D illusion or glister.

Figure 4:
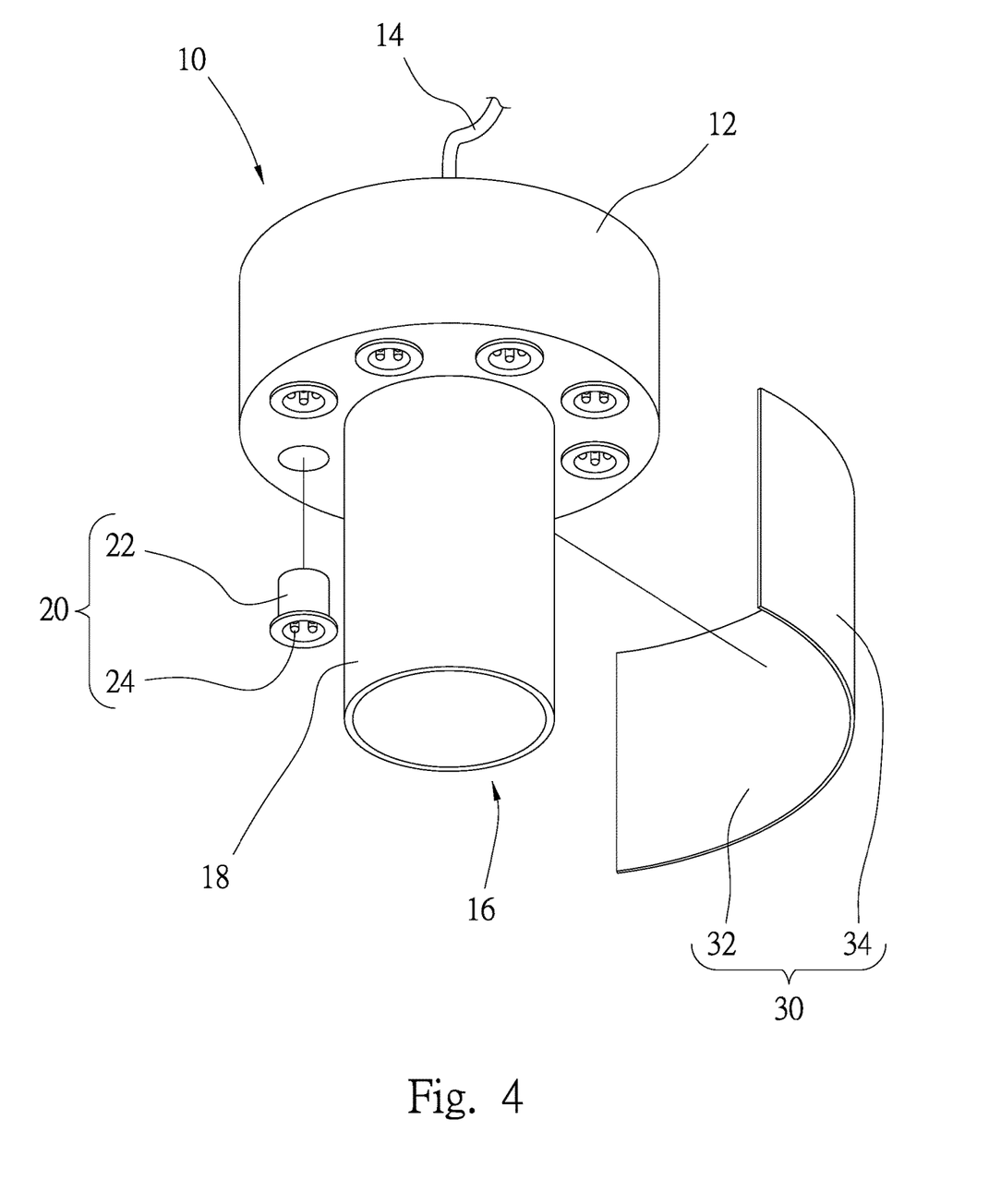
FIG. 4 is an exploded view of an illuminator according to a second embodiment of the present invention.
Figure 5:
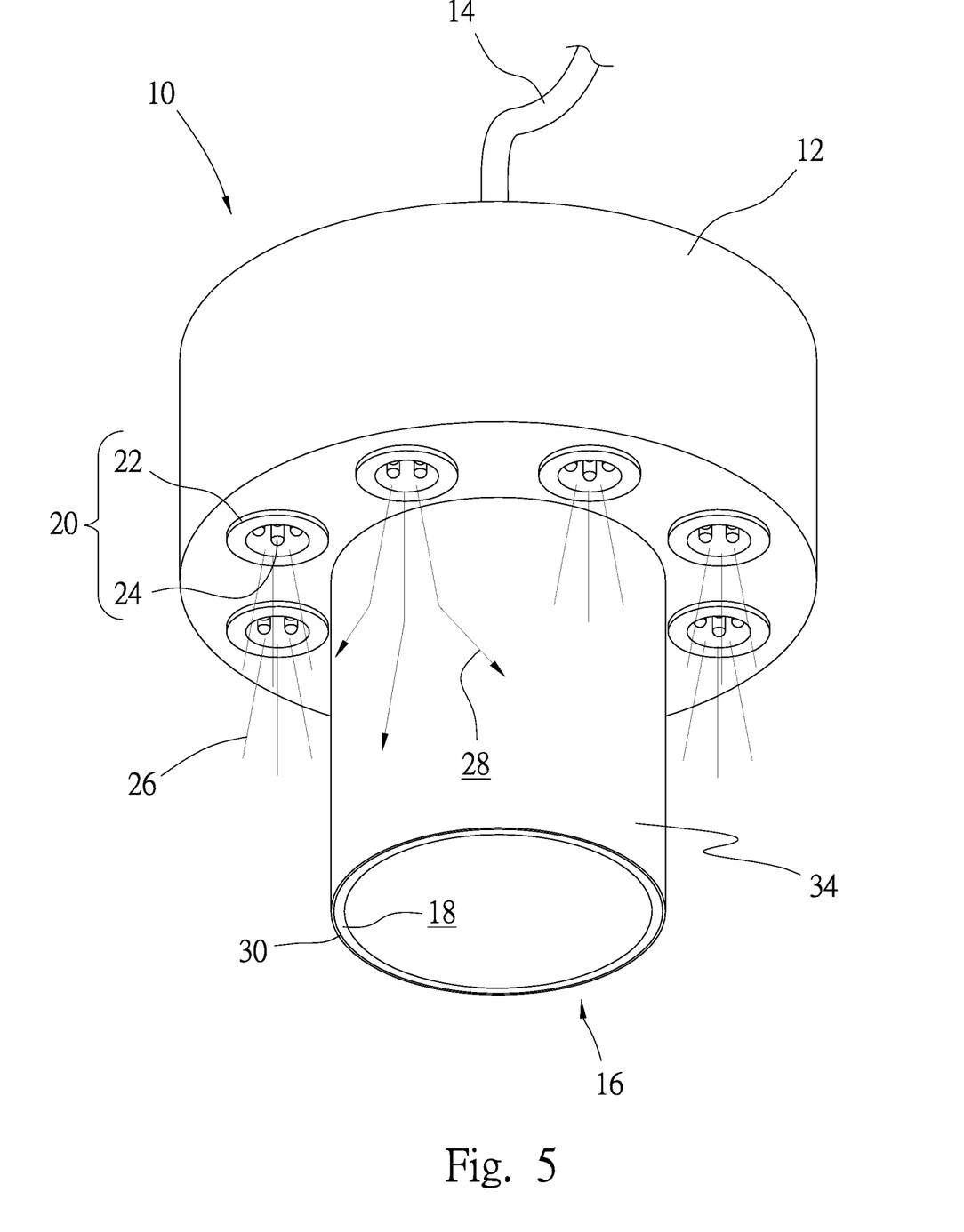
FIG. 5 is a perspective view of the illuminator shown in FIG. 4.

Referring to FIGS. 4 and 5, there is an illuminator 10 according to a second embodiment of the present invention. The second embodiment is identical to the first embodiment except for several features. Firstly, the illuminator 10 is a circular chandelier without any lens.

Secondly, the illuminator 10 includes a holder 12 instead of the holder 22. The pair of wires 14 is connected to the holder 12.

Thirdly, the illuminator 10 includes a supporting element 16 in addition. The supporting element 16 is a tubular element extending from the bottom of the holder 12. The supporting element 16 can be in a circular configuration as shown or a polygonal or any other proper configuration without affecting the attachment of the hologram label 30 to the supporting element 16.

Fourthly, the internal face 32 of the hologram label 30 is attached to an external face of the supporting element 16. Thus, the hologram label 30 resumes the shape of the supporting element 16.

Fifthly, several light sources 20 are connected to the bottom of the holder 12. The light sources 20 are located around and above the supporting element 16. The light sources 20 can cast beams of incident light 26 onto the external face 34 of the hologram label 30. The external face 34 of the hologram label 30 reflects the light and hence provides beams of reflected light 28. The beams of reflected light 28 provide different 3D effects such as symphony and glister when observed at different angles.

Figure 6:
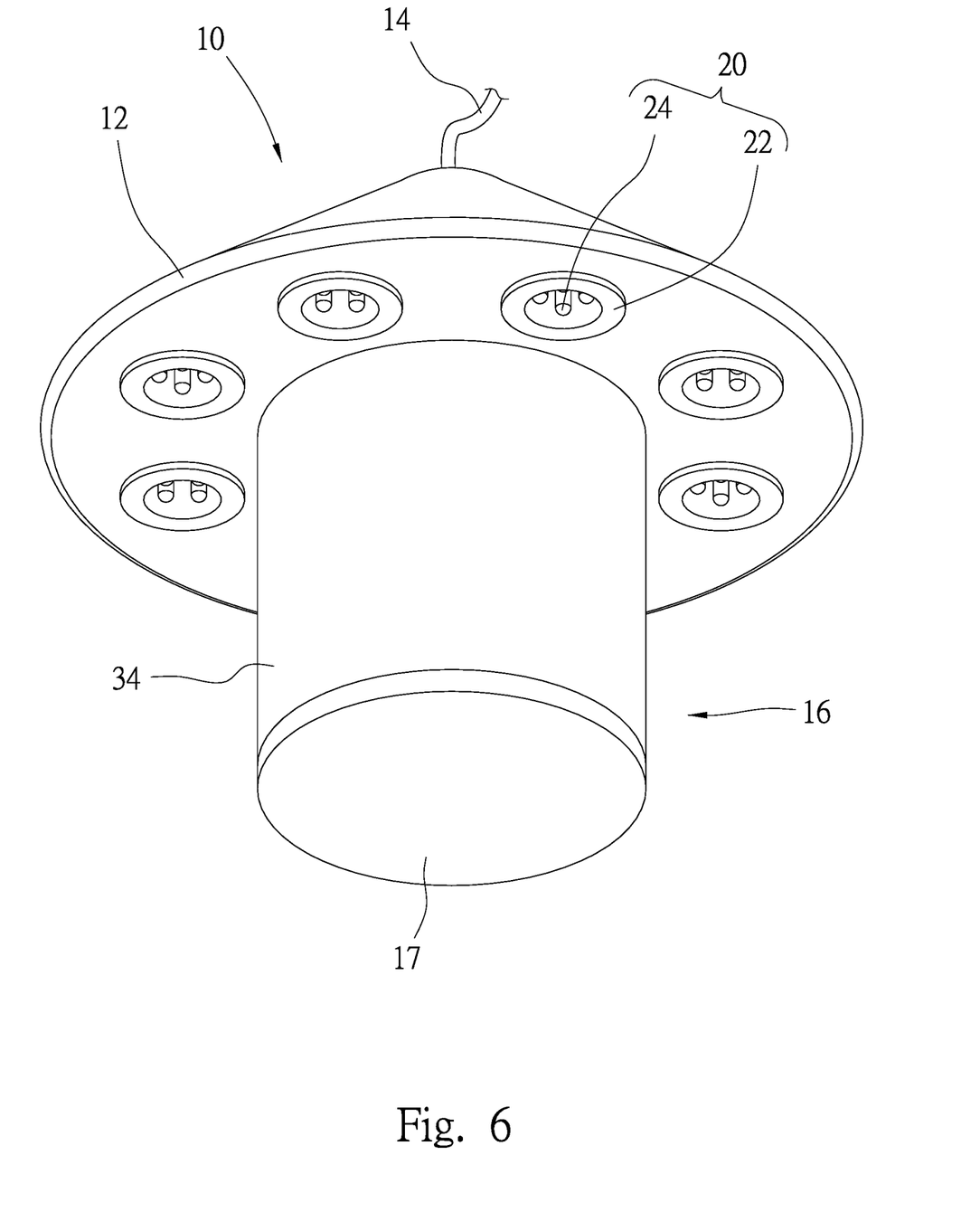
FIG. 6 is a perspective view of an illuminator according to a third embodiment of the present invention.

Referring to FIG. 6, there is an illuminator 10 according to a third embodiment of the present invention. The third embodiment is identical to the second embodiment except for several features.

Firstly, there is an additional bottom plate 17. The bottom plate 17 is attached to and hence closes a lower open end of the cylinder 18 (FIG. 5).

Secondly, the holder 12 is in a conical configuration.

Figure 7:
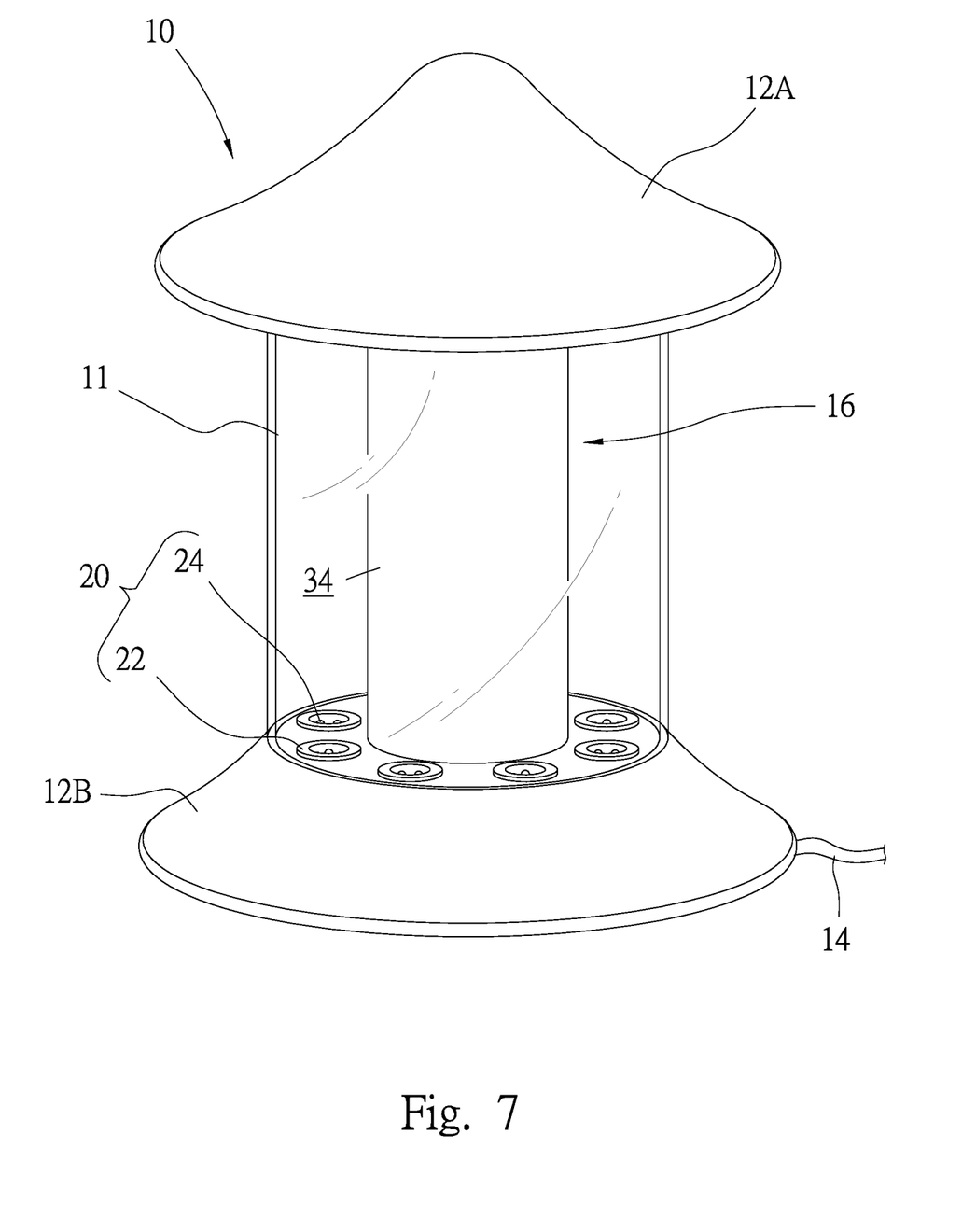
FIG. 7 is a perspective view of an illuminator according to a fourth embodiment of the present invention.

Referring to FIG. 7, there is an illuminator 10 according to a fourth embodiment of the present invention. The fourth embodiment is identical to the third embodiment except for several features.

Firstly, the illuminator 12 includes an upper holder 12A instead of the holder 12. The upper holder 12A is used as a cover. The pair of wires 14 does not extend out of the upper holder 12A from the top of the upper holder 12A.

Secondly, the illuminator 10 includes a lower holder 12B in addition. The lower holder 12B is in the form of a conical frustum. The lower holder 12B is used as base. The pair of wires 14 extends out of the lower holder 12B.

Thirdly, several light sources 20 are connected to the top of the lower holder 12B. The light sources 20 connected to the lower holder 12B can cast beams of incident light onto the external face 34 of the hologram label 30.

Fourthly, the illuminator 10 further includes a lens 11 made of glass or acrylic. The lens 11 is located between the upper holder 12A and the lower holder 12B in an axial direction. The lens 11 extends around the light sources 20 and the hologram label 30, which extends around the supporting element 16. Thus, the lens 11 protects the light sources 20 and the hologram label 30, without affecting the visional effects provided by the illuminator 10.

Figure 8:
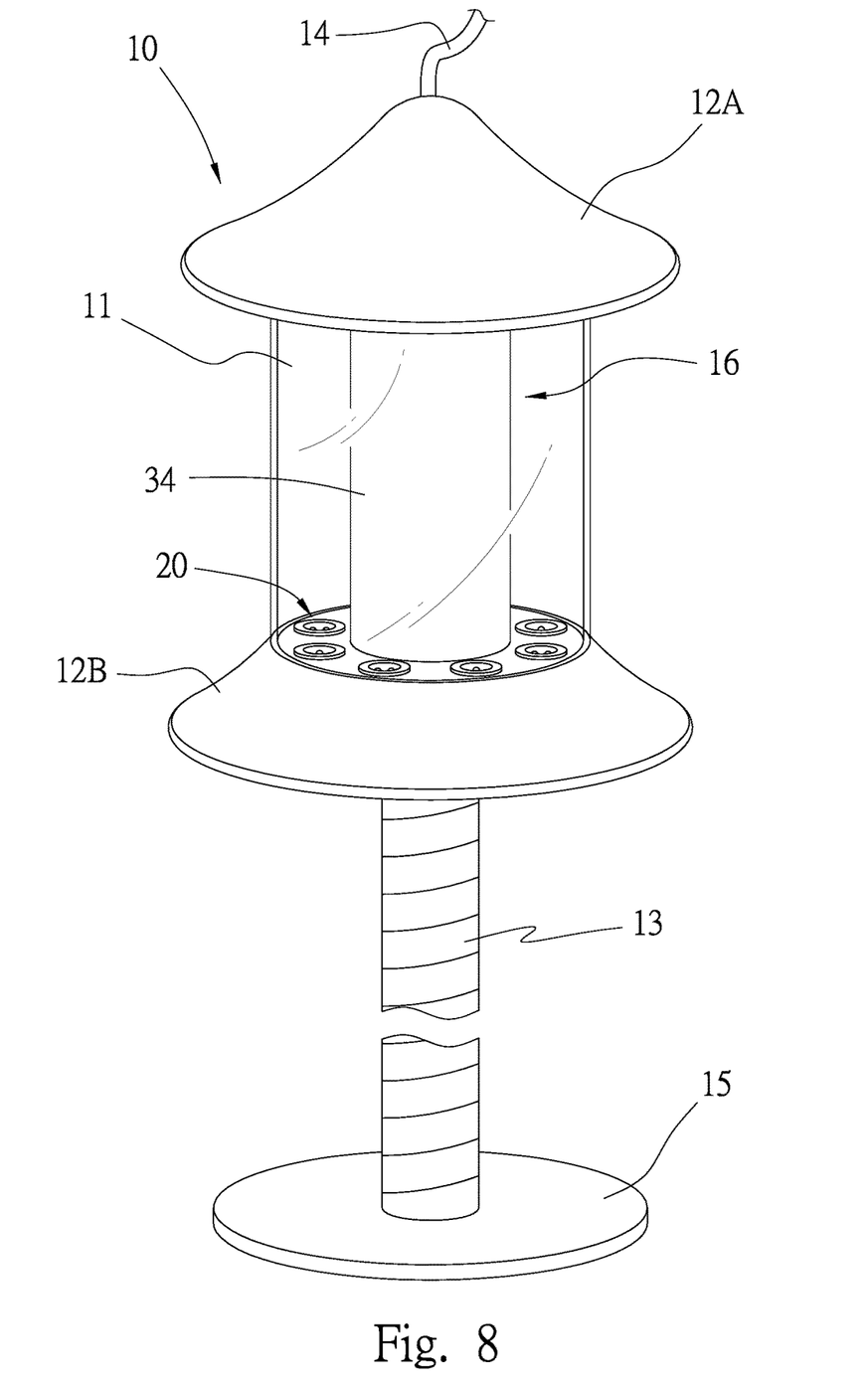
FIG. 8 is a perspective view of an illuminator according to a fifth embodiment of the present invention.

Referring to FIG. 8, there is an illuminator 10 according to a fifth embodiment of the present invention. The fifth embodiment is identical to the fourth embodiment except for several features.

Firstly, the illuminator 10 includes a post 13 and a base 15 in addition. The post 13 includes an upper end connected to the bottom of the holder 12B and a lower end attached to the top of the base 15. The post 13 is preferably a hollow element.

Secondly, the pair of wires 14 extends out of the upper holder 12A instead of the lower holder 12B.

Referring to FIGS. 9 to 12, there is an illuminator 10 according to a sixth embodiment of the present invention. The sixth embodiment is identical to the fourth embodiment except for several features.

Figure 9:
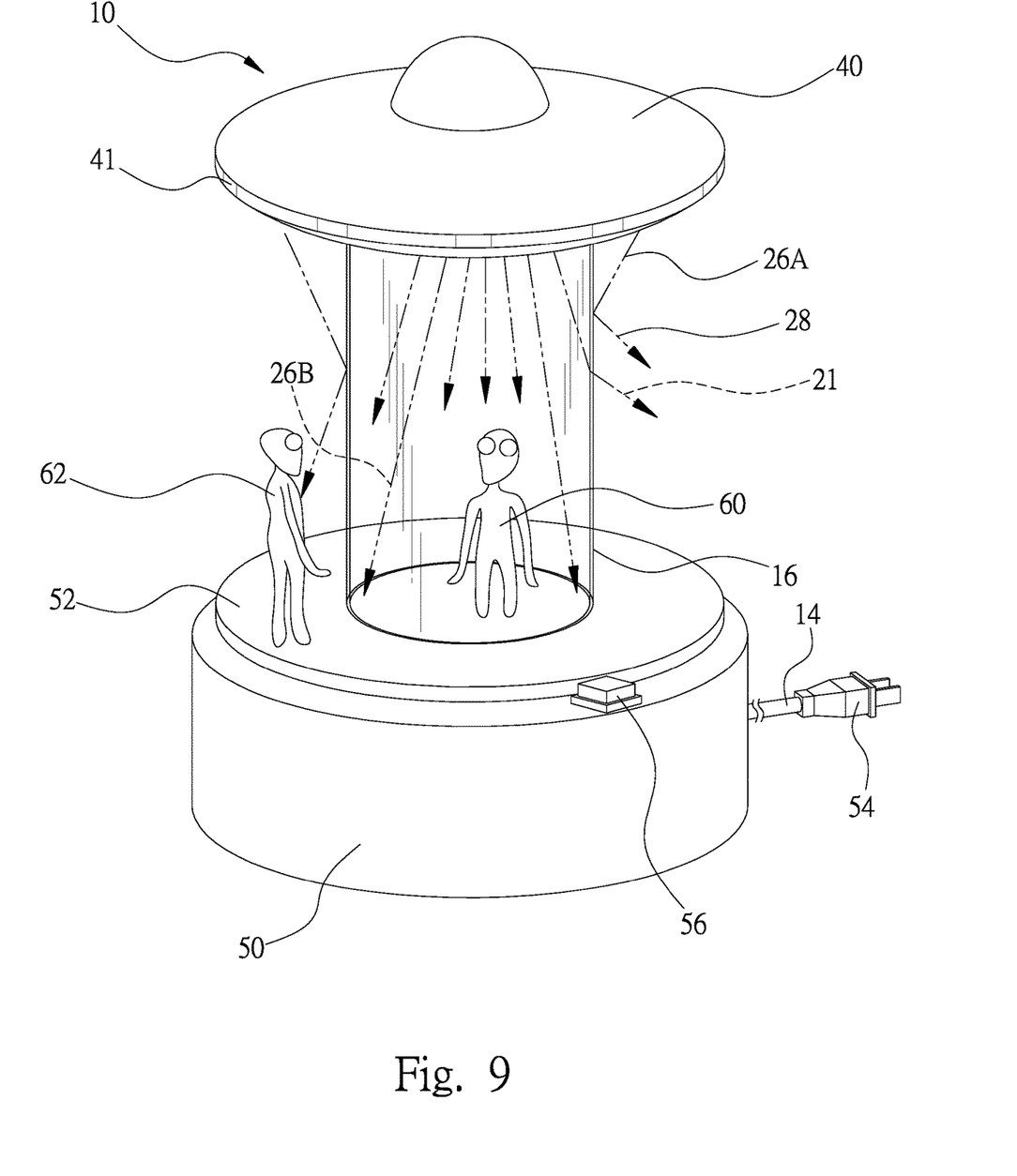
FIG. 9 is a perspective view of an illuminator according to a sixth embodiment of the present invention.
Figure 10:
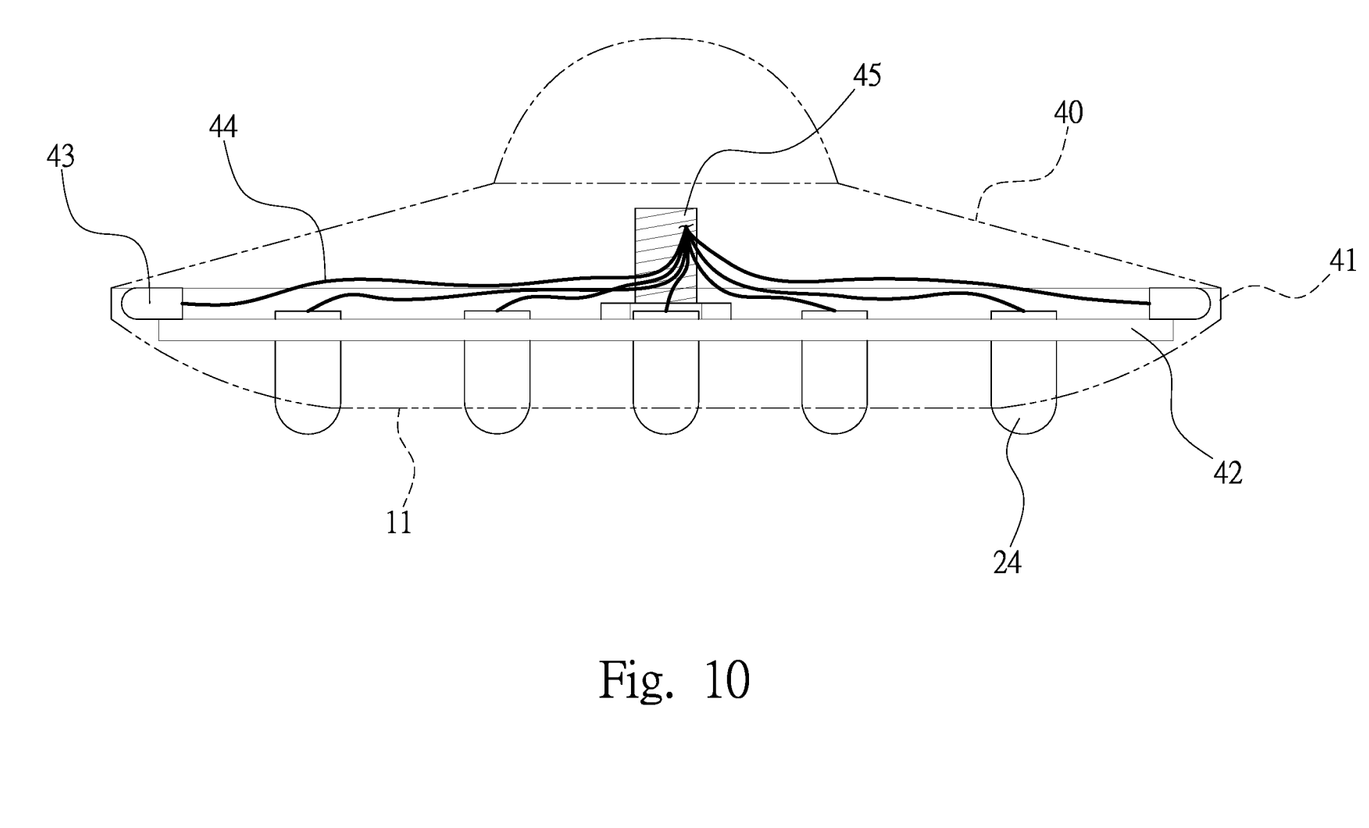
FIG. 10 is a side view of a cover of the illuminator shown in FIG. 9.
Figure 11:
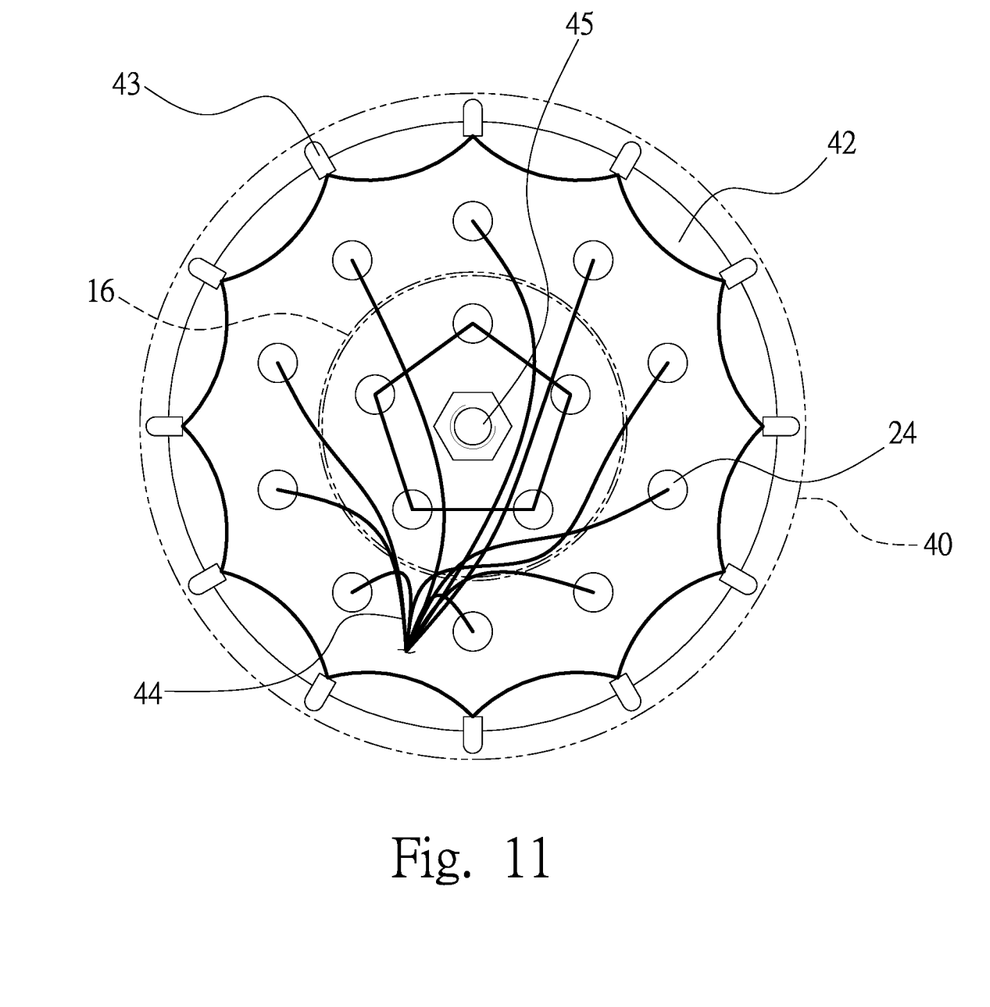
FIG. 11 is a top view of the cover shown in FIG. 10.

Firstly, the illuminator 10 includes a holder 40 instead of the holder 12. The holder 40 is in the form of a flying disc. The holder 40 includes a shell connected to a supporting plate 42 via a fastener 45 so that the holder 40 covers and protects the supporting plate 42. The supporting plate 42 is connected to the light sources 20 and additional light-emitting diodes 43 via wiring 44. The light sources 20 can cast beams of incident light downward. The light-emitting diodes 43 can cast beams of incident light in radial directions of the supporting plate 42.

Secondly, the illuminator 10 includes a lens 41 instead of the lens 11. The lens 41 is attached to the holder 40. The lens 41 covers and protects the light-emitting diodes 24 and 43. Light cast by the light-emitting diodes 24 and 43 is allowed to go through the lens 41.

Thirdly, the light-emitting diodes 24 are divided into two groups. The first group of light-emitting diodes 24 is arranged in a circle in the combination of the hologram label 30 with the supporting element 16. The second group of light-emitting diodes 24 is arranged in a circle out of the combination of the hologram label 30 with the supporting element 16.

Fourthly, the supporting element 16 is translucent or transparent. The hologram label 30 is translucent. Thus, light emitted from the second group of light-emitting diodes 24 can go through the combination of the hologram label 30 with the supporting element 16 in a direction toward the external face 34 from the internal face 32. The external face 34 is blank, i.e., without any letter, character, number, pattern, symbol or mark.

Figure 12:
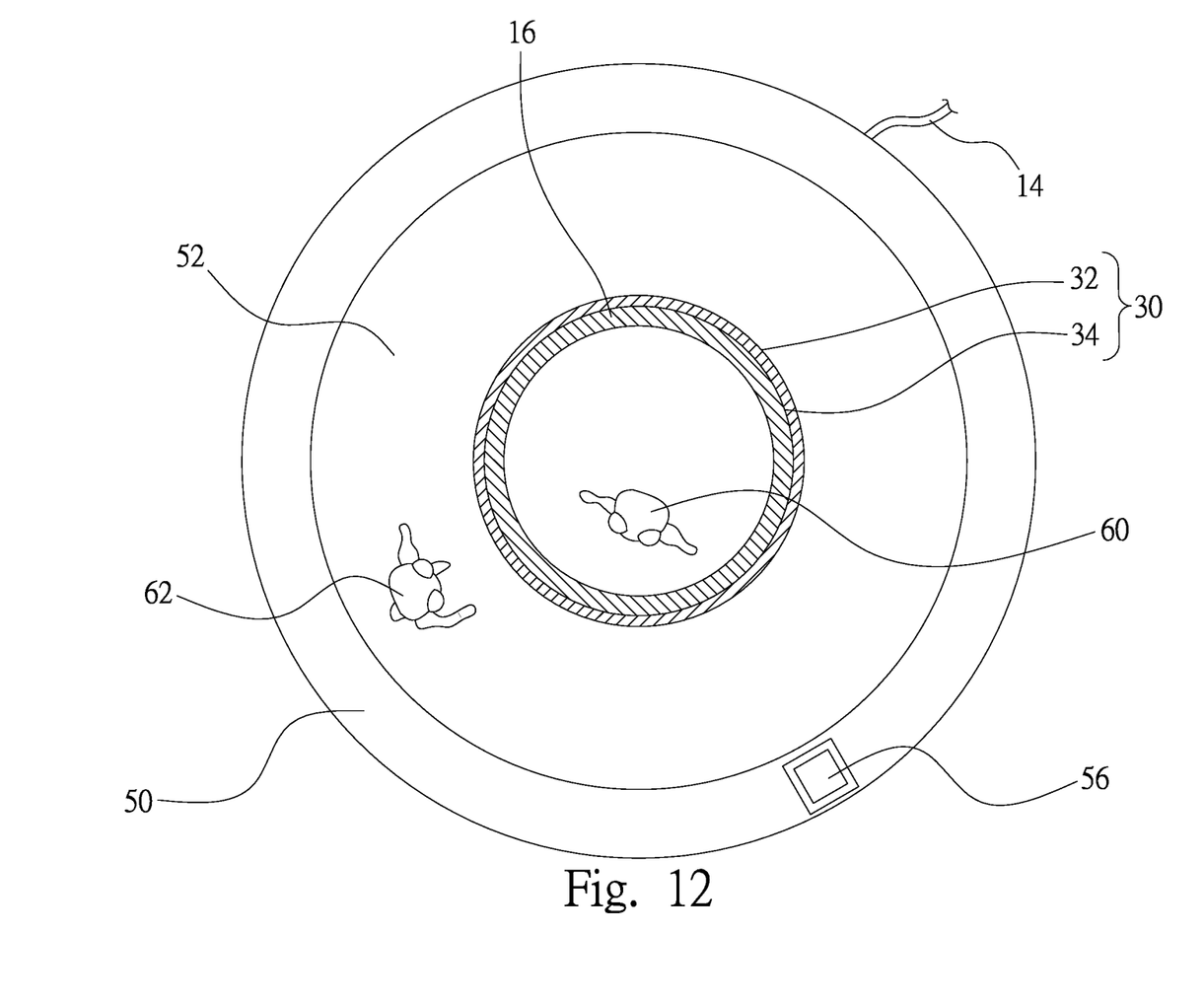
FIG. 12 is a side view of a base of the illuminator shown in FIG. 9.

Fifthly, the illuminator 10 includes a holder 50 instead of the holder 12B. A switch 56 is supported on a platform 52 formed on the holder 50. The switch 56 is connected to the pair of wires 14 so that the switch 56 is operable to turn on and off the illuminator 10. A plug 54 is connected to an end of the pair of wires 14. The plug 54 can be inserted in a socket connected to the mains. No light source is supported on the holder 50.

Sixthly, two additional dolls 60 and 62 are supported on the platform 52 of the holder 50. The doll 60 is located in the combination of supporting element 16 with the hologram label 30. The doll 62 is located out of the combination of the supporting element 16 with the hologram label 30. The doll 60 is separated from the doll 62 by the combination of the supporting element 16 with the hologram label 30.

The first group of light-emitting diodes 24 cast external incident light 26A that is colorless onto the external face 34 of the hologram label 30. The external incident light 26A is reflected from the external face 34 of the hologram label 30 and turned into reflected light 28 in a color. The second group of light-emitting diodes 24 casts internal incident light 26B that is colorless. The internal incident light 26B light travels through the combination of the supporting element 16 with the hologram label 30 and becomes refracted light 21. The refracted light 21, colorless or in a color, is mixed with the reflected light 28, thereby changing the visional effect exhibited by the illuminator 10. In specific, the illuminator 10 exhibits light in red, orange, yellow, green, blue, cyan or purple depending on the angle at which it is observed. Thus, the illuminator 10 can exhibits light in various colors to provide various atmospheres.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. An illuminator comprising:
a supporting element being a hollow element;
a hologram label comprising an internal face attached to the supporting element and an external face used as a reflective face; and
light-emitting diodes located near the hologram label, wherein the light-emitting diodes are used to emit incident light onto the reflective face of the hologram label that reflects the incident light and hence provides reflected light, the incident light is colorless, and the reflected light is in at least one color.

2. The illuminator according to claim 1, wherein the reflective face of the hologram label is blank.

3. The illuminator according to claim 1, further comprising a lens extending around the supporting element.

4. The illuminator according to claim 1, further comprising a holder connected to the supporting element, wherein the light-emitting diodes are connected to the holder around the supporting element.

5. The illuminator according to claim 1, further comprising two holders connected to two ends of the supporting element, wherein the light-emitting diodes are connected to at least one of the holders around the supporting element.

6. The illuminator according to claim 1, further comprising a bottom plate attached to an open end of the supporting element.

7. The illuminator according to claim 1, further comprising a lens extending around the supporting element.

8. The illuminator according to claim 1, wherein the supporting element is at least translucent, and the hologram label is a translucent element.

9. The illuminator according to claim 8, further comprising two holders connected to two ends of the supporting element, wherein the light-emitting diodes are located in the supporting element.

10. The illuminator according to claim 8, further comprising two holders connected to two ends of the supporting element, wherein the light-emitting diodes are located out of the supporting element.

11. The illuminator according to claim 8, further comprising two holders connected to two ends of the supporting element, wherein the light-emitting diodes are divided into first and second groups, the first group of light-emitting diodes is located in the supporting element, and the second group of light-emitting diodes is located out of the supporting element.

12. The illuminator according to claim 8, further comprising at least one doll located in the supporting element.

13. The illuminator according to claim 8, further comprising at least one doll located out of the supporting element.

* * * * *